(12) United States Patent
Kitano et al.

(10) Patent No.: US 8,757,120 B2
(45) Date of Patent: Jun. 24, 2014

(54) ENGINE START DEVICE (75) Inventors: Hiroaki Kitano, Tokyo (JP); Masahiko Kurishige, Tokyo (JP); Daisuke Mizuno, Tokyo (JP); Koichiro Kamei, Tokyo (JP); Shiro Yonezawa, Tokyo (JP); Kazuhiro Odahara, Tokyo (JP); Naohito Kaneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 373 days.

(21) Appl. No.: 13/380,525

(22) PCT Filed: Apr. 15, 2010

(86) PCT No.: PCT/JP2010/056746
§ 371 (c)(1),
(2), (4) Date: Dec. 23, 2011

(87) PCT Pub. No.: WO2011/024511
PCT Pub. Date: Mar. 3, 2011

(65) Prior Publication Data
US 2012/0103294 A1 May 3, 2012

(30) Foreign Application Priority Data
Aug. 27, 2009 (JP) ................................. 2009-196695

(51) Int. Cl.
*F02N 11/08* (2006.01)
*F02N 15/02* (2006.01)

(52) U.S. Cl.
USPC ............... 123/179.4; 123/179.25; 123/179.28

(58) Field of Classification Search
USPC .................. 123/179.25, 179.28, 179.3, 179.4; 701/110, 112, 113; 73/114.25, 114.59
See application file for complete search history.

(56) References Cited

U.S. PATENT DOCUMENTS 7,275,509 B2   10/2007   Kassner
8,419,592 B2 *  4/2013   Fujiwara ...................... 477/167
(Continued)

FOREIGN PATENT DOCUMENTS

JP   2003 065191    3/2003
JP   2005 315197   11/2005
(Continued)

OTHER PUBLICATIONS

U.S. Appl. No. 13/499,827, filed Apr. 2, 2012, Kitano, et al.

(Continued)

*Primary Examiner* — Hai Huynh
(74) *Attorney, Agent, or Firm* — Oblon, Spivak, McClelland, Maier & Neustadt, L.L.P.

(57) ABSTRACT

An engine starting device for an automatic idling stop system includes: a crank angle sensor for detecting a crank angle of an engine; a ring gear connected to a crankshaft of the engine, for transmitting rotation of the engine; ring gear rpm detecting section; a starter motor for starting the engine; a pinion gear for transmitting rotation of the starter motor to the ring gear; pinion-gear push-out section for pushing out the pinion gear into meshing engagement with the ring gear; and pinion gear push-out control section for driving the pinion-gear push-out section to bring the pinion gear and the ring gear into meshing engagement when the ring gear rpm detected by the ring gear rotational speed detection section becomes smaller than a threshold value which is determined by at least one of the crank angle, a gear range, and a restart condition.

22 Claims, 10 Drawing Sheets (56) References Cited

U.S. PATENT DOCUMENTS 8,504,279 B2 * 8/2013 Ishikawa et al. .............. 701/112
2010/0256896 A1 10/2010 Kitano et al.

FOREIGN PATENT DOCUMENTS

| JP | 2005 330813 | 12/2005 |
| JP | 2007 107527 | 4/2007 |
| JP | 2008 106720 | 5/2008 |
| JP | 2010-236533 A | 10/2010 |

OTHER PUBLICATIONS

U.S. Appl. No. 13/516,249, filed Jun. 15, 2012, Kitano, et al.
Japanese Office Action Issued Oct. 23, 2012 in Patent Application No. 2011-528677 (with English translation).
International Search Report issued on Jun. 15, 2010 in PCT/JP10/056746 filed on Apr. 15, 2010.

* cited by examiner

ENGINE START DEVICE

TECHNICAL FIELD

The present invention relates to an engine starting device for an automatic idle-stop system which performs idle-stop of an engine when a predetermined idle-stop condition is satisfied and restarts the engine when a restart condition is satisfied.

BACKGROUND ART

Conventionally, for the purposes of improving fuel efficiency of an automobile, reducing an environmental load, and the like, an automatic idle-stop system, which automatically performs idle-stop when a predetermined condition is satisfied, has been developed. For example, with a method for bringing a starter pinion into meshing engagement with a ring gear and a starter controller described in Patent Literature 1 described below, when an rpm of the ring gear is within a predetermined range and a direction of rotation is forward, the pinion gear is brought into meshing engagement with the ring gear. A meshing state between the pinion gear and the ring gear in an early stage is realized.

In Patent Literature 2 described below, when a direction of rotation of a ring gear which rotates reversely changes to be forward again, the pinion gear is brought into meshing engagement.

CITATION LIST

Patent Literature

Patent Literature 1: JP 2007-107527 A
Patent Literature 2: JP 2005-315197 A

SUMMARY OF INVENTION

Technical Problems

In Patent Literature 1 described above, however, it is not believed that a torque fluctuation due to compression/expansion of a piston is taken into consideration. Therefore, for example, if there is a cylinder which starts an expansion stroke immediately after the rpm of the ring gear becomes smaller than a maximum rpm within the predetermined range, the rpm of the ring gear is increased. As a result, at a time when the pinion gear comes into abutment against the ring gear, the rpm exceeds the predetermined range of rpm. Accordingly, meshing performance is sometimes lowered.

In Patent Literature 2 described above, when a restart request is made by a driver during the reverse rotation, it is necessary to wait until the reversely rotating ring gear starts rotating in the forward direction. Therefore, there is a fear in that the driver feels discomfort at the time of restart.

The present invention has been made to solve the problems described above, and therefore has an object to provide an engine starting device in an automatic idle-stop system, which enables meshing engagement between a pinion gear and a ring gear smoothly (with good meshing performance) and quickly while an engine is rotating by inertia.

Solution to Problems

The present invention provides an engine starting device for an automatic idle-stop system for performing idle-stop when a predetermined idle-stop condition is satisfied and for restarting an engine when a restart condition is satisfied, including: a crank-angle sensor for detecting a crank angle of the engine; a ring gear connected to a crankshaft of the engine, for transmitting rotation of the engine; ring-gear rpm detecting section for detecting an rpm of the ring gear; a starter motor for starting the engine; a pinion gear for transmitting rotation of the starter motor to the ring gear; pinion-gear push-out section for pushing out the pinion gear to bring the pinion gear into meshing engagement with the ring gear; and pinion-gear push-out control section for driving the pinion-gear push-out section to bring the pinion gear and the ring gear into meshing engagement when the ring-gear rpm detected by the ring-gear rpm detecting section becomes smaller than a predetermined threshold value, in which the predetermined threshold value is determined by at least one of the crank angle, a gear range, and the restart condition.

Advantageous Effects of Invention

According to the present invention, the pinion gear and the ring gear can be brought into meshing engagement smoothly and quickly. As a result, the increase of a lifetime of components can be achieved without giving a feeling of discomfort to a driver.

DESCRIPTION OF EMBODIMENTS

In the present invention, timing at which a pinion gear and a ring gear are brought into meshing engagement is determined based on a threshold value set for each crank angle, in which a compression/expansion operation of a piston of an engine is reflected, a threshold value set for each gear range of a transmission, a threshold value set in consideration of a restart condition, and a threshold value in consideration of a plurality of desired ones of the conditions described above. In this manner, a torque fluctuation due to, for example, compression/expansion of the piston, which is generated for each crank angle, can be predicted. Pinion-gear push-out section is driven by pinion-gear push-out control section according to the predicted torque fluctuation. As a result, after the start of the pinion-gear push-out, a ring-gear rpm starts increasing. When the pinion gear and the ring gear then actually come into abutment against each other, the ring-gear rpm can be prevented from being out of the range in which meshing engagement can be achieved. As a result, the pinion gear and the ring gear can be smoothly brought into meshing engagement.

Hereinafter, an engine starting device according to the present invention is described by means of embodiments with reference to the drawings. In the drawings, the same or equivalent parts are denoted by the same reference numerals, and the overlapping description is herein omitted.

First Embodiment

Figure 1:
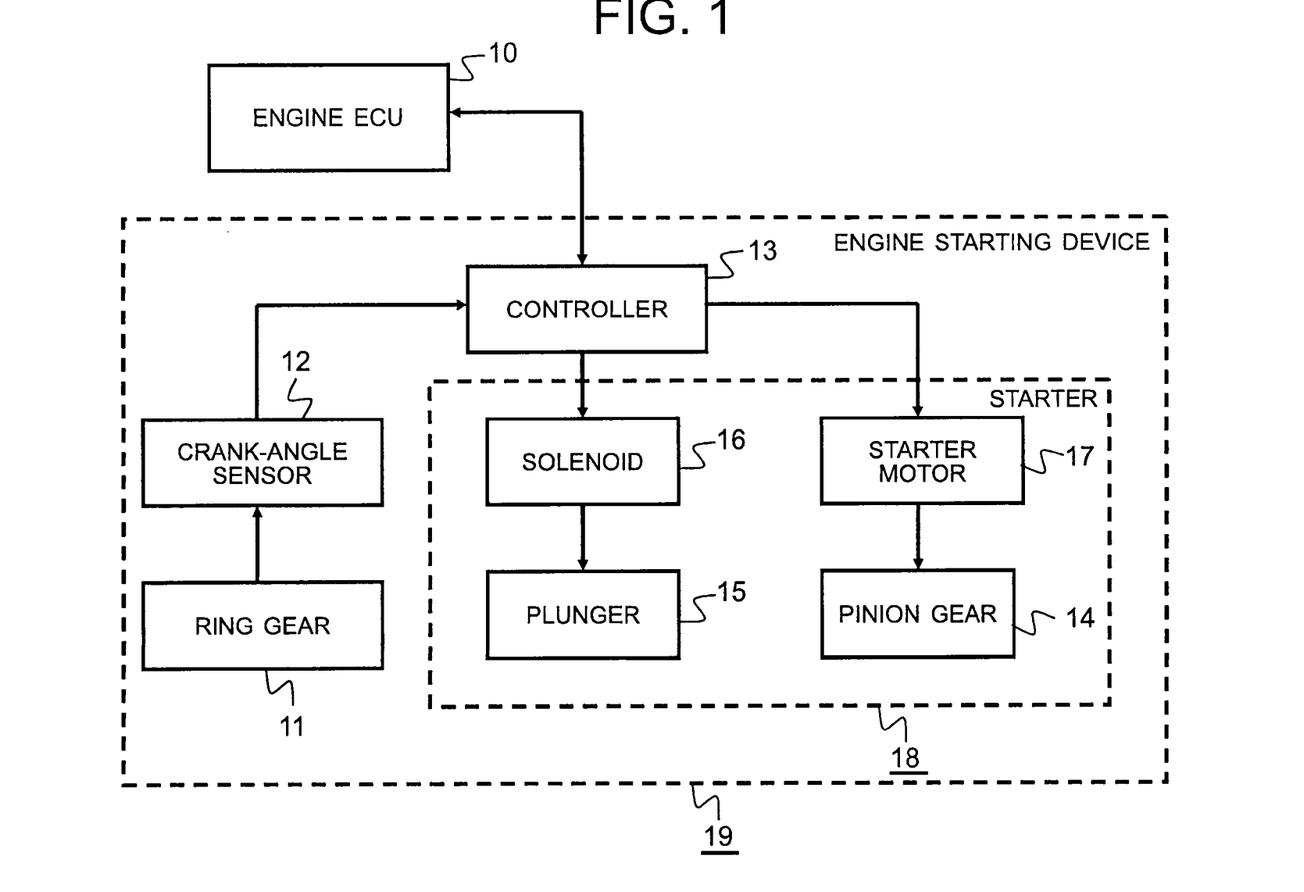
FIG. 1 A block diagram illustrating a schematic configuration of an engine starting device according to a first embodiment of the present invention.

FIG. 1 is a block diagram illustrating a schematic configuration of an engine starting device according to a first embodiment of the present invention. In FIG. 1, an engine ECU 10 determines whether or not idle-stop conditions (for example, a speed is equal to or lower than 5 km/h, a driver depresses a brake pedal, and the like) and inputs the results of determination to a controller 13 of an engine starting device 19. The engine starting device 19 includes a ring gear 11 connected to a crankshaft (not shown) of an engine to transmit rotation of the engine, a crank angle sensor 12 for detecting a crank angle of the engine, a starter 18, and a controller 13 for controlling energization of a starter motor 17 and a solenoid 16. The starter 18 includes a pinion gear 14 transmitting rotation of the starter motor 17, a plunger 15 for pushing out the pinion gear 14 to achieve meshing engagement with the ring gear 11, and the solenoid 16 which can move the plunger 15 by being energized. The controller 13 can control the energization of the starter motor 17 and the energization of the solenoid 16.

Although the controller 13 and the engine ECU 10 are illustrated in FIG. 1 as being independent of each other, the engine ECU 10 may perform processing instead of providing the controller 13. Therefore, the engine starting device 19 may include the engine ECU 10. The controller 13 and the engine ECU 10 constitute ring-gear rpm detecting section and pinion-gear push-out control section, whereas the plunger 15 and the solenoid 16 constitute pinion-gear push-out section.

Figure 2:
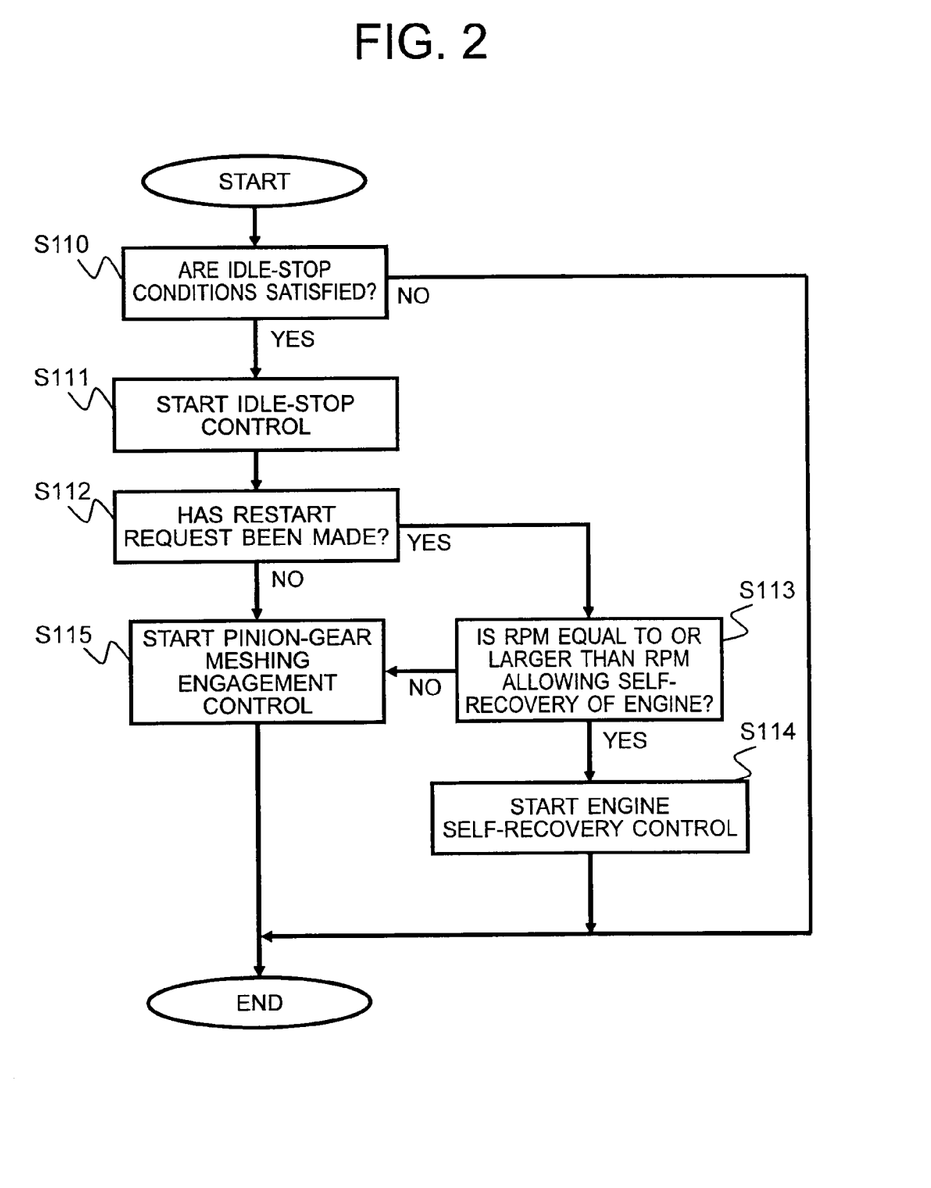
FIG. 2 A flowchart illustrating a flow of idle-stop control in the first embodiment of the present invention
FIG. 3 A flowchart illustrating a flow of pinion-gear push-out control in the first embodiment of the present invention.
Figure 3:
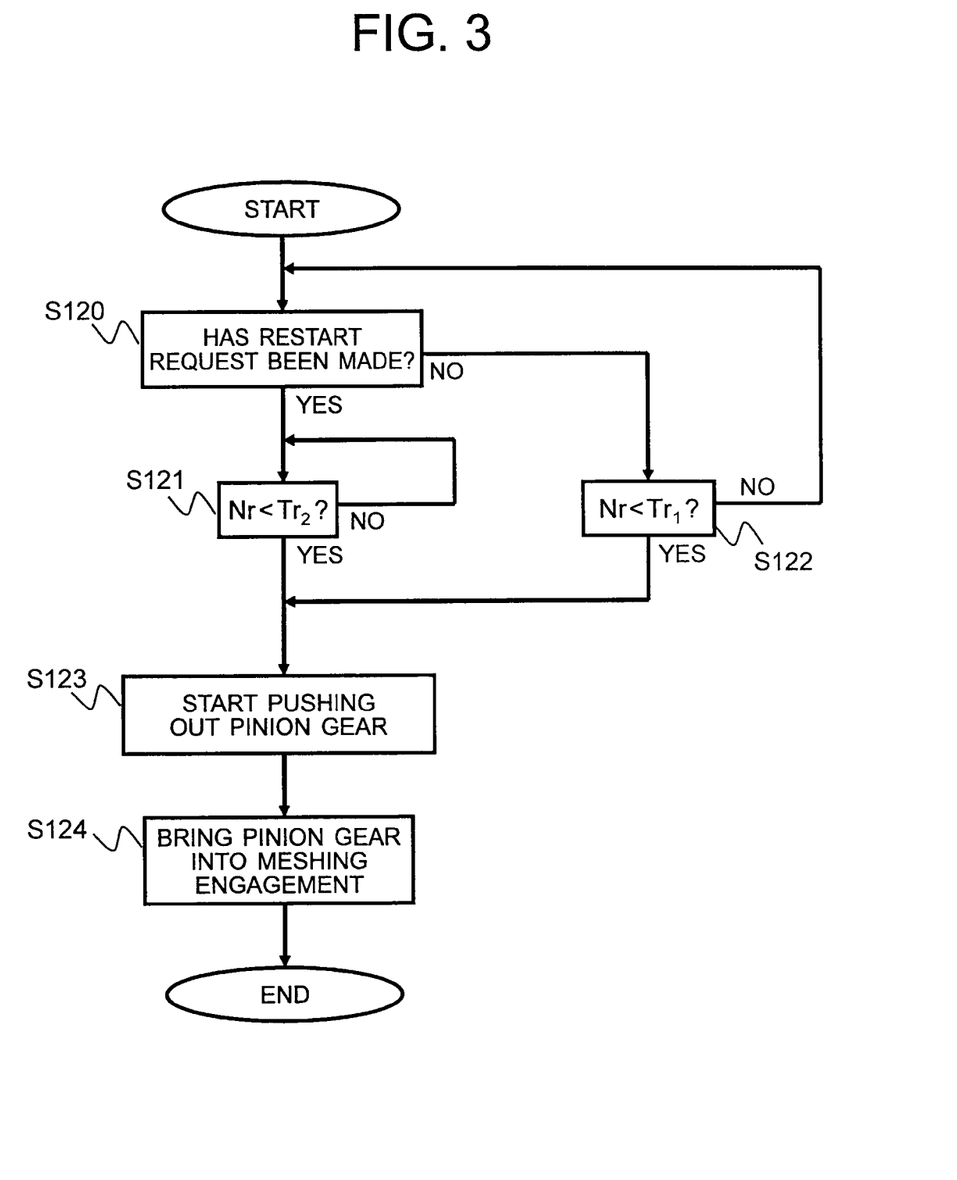

Processing performed in the controller 13 and the engine ECU 10 in the present invention is now described referring to flowcharts of FIGS. 2 and 3. First, an operation of idle-stop control before the pinion gear 14 and the ring gear 11 are brought into meshing engagement is described with reference to FIG. 2. Whether or not the idle-stop conditions are satisfied is determined based on a signal input to the engine ECU 10 (S110). When the idle-stop conditions are not satisfied, the processing proceeds to a next control cycle. When the idle-stop conditions are satisfied in Step S110, idle-stop control is started (S111) so that fuel supply to the engine is stopped by control of the engine ECU 10. Then, it is determined based on the signal to the engine ECU 10 whether or not an engine restart request (for example, release of a foot from the brake pedal or the like) is made by a driver while the ring-gear rpm is being reduced by the rotation of the engine by inertia (S112). When the restart request is made, the processing proceeds to Step S113 where it is determined whether a ring-gear rpm Nr is equal to or larger than an rpm allowing self-recovery of the engine (for example, 500 rpm).

The ring-gear rpm Nr is computed by the controller 13 from a sensor input cycle from the crank-angle sensor 12. Instead, the ring-gear rpm Nr may be detected by using another means such as FV (frequency to voltage) conversion of a signal from an encoder or a pulse generator.

The rpm allowing self-recovery of the engine is an rpm which allows restart only by injecting and igniting a fuel without cranking by the starter 18. For example, control for injecting a larger amount of the fuel to facilitate a combustion is performed. The details of the control of engine self-recovery are not encompassed in the present invention.

In Step S113, when it is determined that the ring-gear rpm is equal to or larger than the rpm allowing self-recovery of the engine, the processing proceeds to Step S114 where the engine self-recovery control is performed on the engine to restart the engine. When the restart request has not been made by the driver in Step S112 or when the ring-gear rpm is smaller than the rpm allowing self-recovery of the engine in Step S113, the processing proceeds to Step S115 where control for bringing the pinion gear 14 into meshing engagement with the ring gear 11 is performed.

Next, referring to FIG. 3, control for pushing out the pinion gear to bring the pinion gear 14 and the ring gear 11 into meshing engagement is described. When the idle-stop conditions are satisfied, the rotation of the engine is reduced by the idle stop. Then, first, whether or not the restart request has been made is determined (S120). When it is determined that the restart request has not been made, the processing proceeds to Step S122 where the ring-gear rpm Nr and a threshold value $Tr_1$ are compared with each other. When the ring-gear rpm Nr is smaller, the processing proceeds to Step S123. In Step S123, the energization of the solenoid 16 is started to drive the plunger 15 so as to bring the pinion gear 14 and the ring gear 11 into meshing engagement with each other (S124). When the ring-gear rpm Nr is equal to or larger than the threshold value $Tr_1$ in Step S122, the processing returns to Step S120. Then, Steps S120 to S122 are repeated until the ring-gear rpm Nr becomes smaller than the threshold value $Tr_1$.

Now, $Tr_1$ is briefly described. In general, there is a time delay from the start of the energization of the solenoid 16 to the actual abutment of the ring gear 11 and the pinion gear 14. Even during the time delay, the ring-gear rpm Nr changes. Therefore, by presetting a change amount in the ring-gear rpm Nr during the time delay as the threshold value $Tr_1$ from engine characteristics, the ring-gear rpm at the time of abutment of the gears is reduced to enable the meshing engagement quietly.

When the restart request is made in Step S120 before the ring-gear rpm Nr becomes smaller than the threshold value $Tr_1$, the processing proceeds to Step S121 where the ring-gear rpm Nr and a threshold value $Tr_2$ are compared with each other. When the ring-gear rpm Nr is smaller, the processing proceeds to Step S123. In Step S123, the energization of the solenoid 16 is started to drive the plunger 15 so as to bring the pinion gear 14 and the ring gear 11 into meshing engagement (S124). When the ring-gear rpm Nr is equal to or larger than the threshold value $Tr_2$ in Step S121, the processing waits until the ring-gear rpm Nr is reduced to be smaller than the threshold value $Tr_2$.

Figure 4:
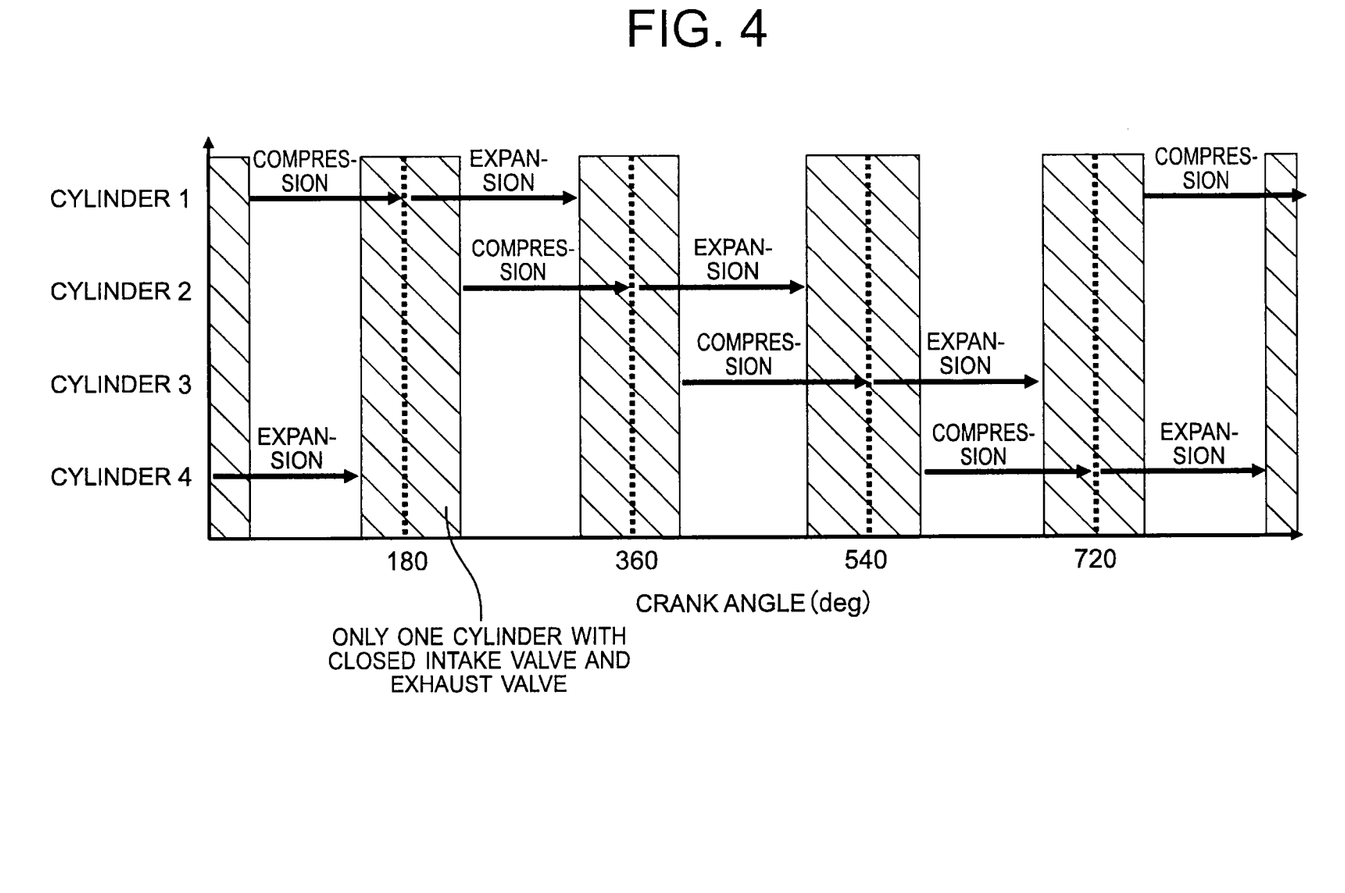
FIG. 4 An image diagram illustrating a crank angle and intake and exhaust strokes of each cylinder of a four-cylinder engine in the first embodiment of the present invention.

The threshold values $Tr_1$ and $Tr_2$ are now described taking a four-cylinder engine as an example. FIG. 4 illustrates, as an example, strokes of each cylinder during one cycle in the four-cylinder engine. One cycle (four strokes, that is, compression, expansion, exhaustion, and intake strokes) is performed for each cylinder during two revolutions (720 degrees). As indicated in a hatched area, in the vicinity of TDC of each cylinder, an intake valve and an exhaust valve of only one cylinder are closed. Further, a time period in which both valves are closed is a time period in which a torque fluctuation due to expansion/compression at the time of passage through TDC becomes the largest. At the crank angle in the vicinity of TDC, a pulsation of the ring-gear rpm becomes large.

Therefore, the threshold values $Tr_1$ and $Tr_2$ are set for each crank angle $C_{ang}$ detected by the crank-angle sensor 12. For the threshold values $Tr_1$ and $Tr_2$, in the case where the engine includes a plurality of cylinders, over a time period (angle range) from a crank angle at which a torque which is going to increase the ring-gear rpm during the expansion stroke becomes larger than a torque which is going to reduce the ring-gear rpm due to friction or the like to a crank angle at which the torque which is going to reduce the ring-gear rpm due to friction or the like becomes larger than the torque which is going to increase the ring-gear rpm during the expansion stroke (for example, from 10 degrees before top dead center (BTDC) of a cylinder 1 to 30 degrees after top dead center (ATDC) of the cylinder 1 (150 degrees BTDC of a cylinder 2) illustrated in FIG. 4), the ring-gear rpm threshold value Tr (including $Tr_1$ and $Tr_2$; the same is applied to the following) may be set lower than the threshold values at the other crank angles.

Moreover, the crank-angle range in the vicinity of TDC described above may be a crank-angle range in which an angular acceleration of the engine rotation tends to increase.

Figure 5:
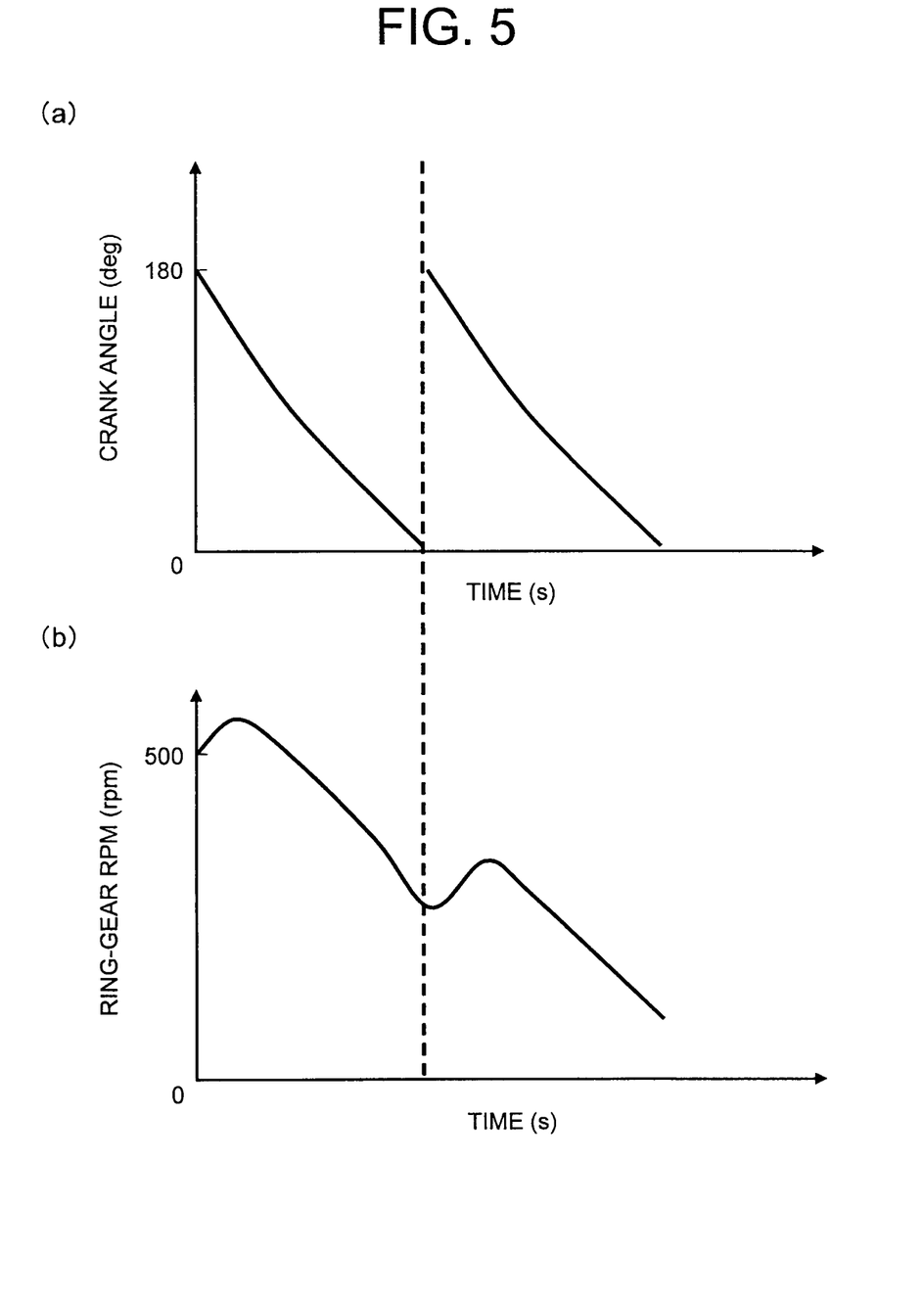
FIG. 5 Image diagrams illustrating a ring-gear rpm and the crank angle when an rpm of an engine is reduced by rotation by inertia from the start of idle-stop in the first embodiment of the present invention.
Figure 6:
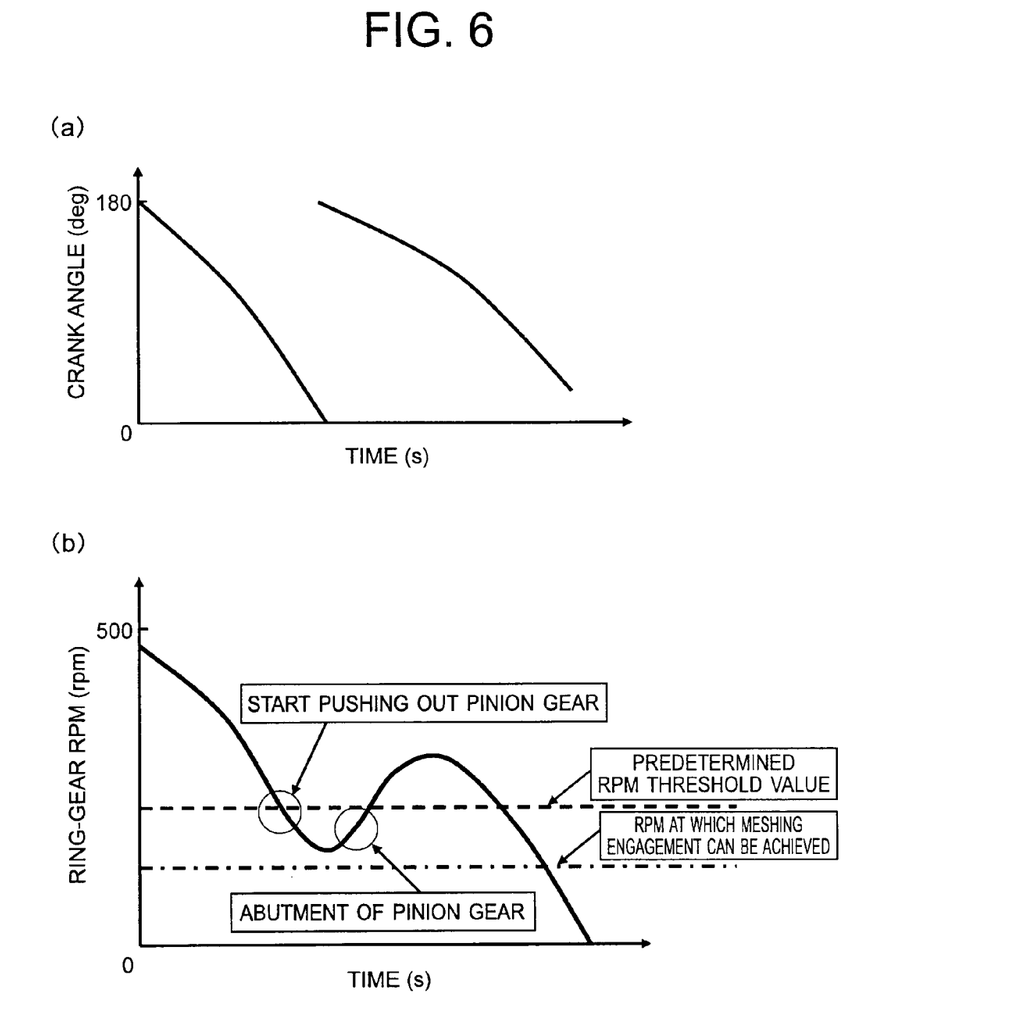
FIG. 6 Image diagrams illustrating temporal changes in the ring-gear rpm and the crank angle while the engine is rotating by inertia when a threshold value is set constant.

The ring-gear rpm Nr during the rotation by inertia due to the idle stop reduces while periodically generating the pulsation for each crank angle as illustrated in FIG. 5 due to the torque fluctuation during the intake/exhaust strokes or the like. FIG. 5(a) shows the crank angle, and FIG. 5(b) shows the ring-gear rpm in the same time. FIG. 6 are image diagrams illustrating temporal changes in the ring-gear rpm and the crank angle while the engine is rotating by inertia when the threshold value is set constant. FIG. 6(a) shows the crank angle, and FIG. 6(b) shows the ring-gear rpm and the predetermined threshold values (see "predetermined rpm threshold value" and "rpm at which meshing engagement can be achieved"). If the threshold value Tr is set constant without determining the threshold value Tr for each crank angle, the torque which increases the rpm during the expansion stroke is generated at the time when the pinion gear 14 and the ring gear 14 actually come into abutment against each other after the pinion gear 14 is pushed out for the meshing engagement between the pinion gear 14 and the ring gear 11 as illustrated in FIG. 6. As a result, the ring-gear rpm Nr (see FIG. 6(b)) sometimes becomes larger than the rpm at which the meshing engagement can be achieved. Accordingly, the meshing engagement cannot be achieved smoothly to reduce a lifetime of components or generate collision noise between the gears in some cases.

Figure 7:
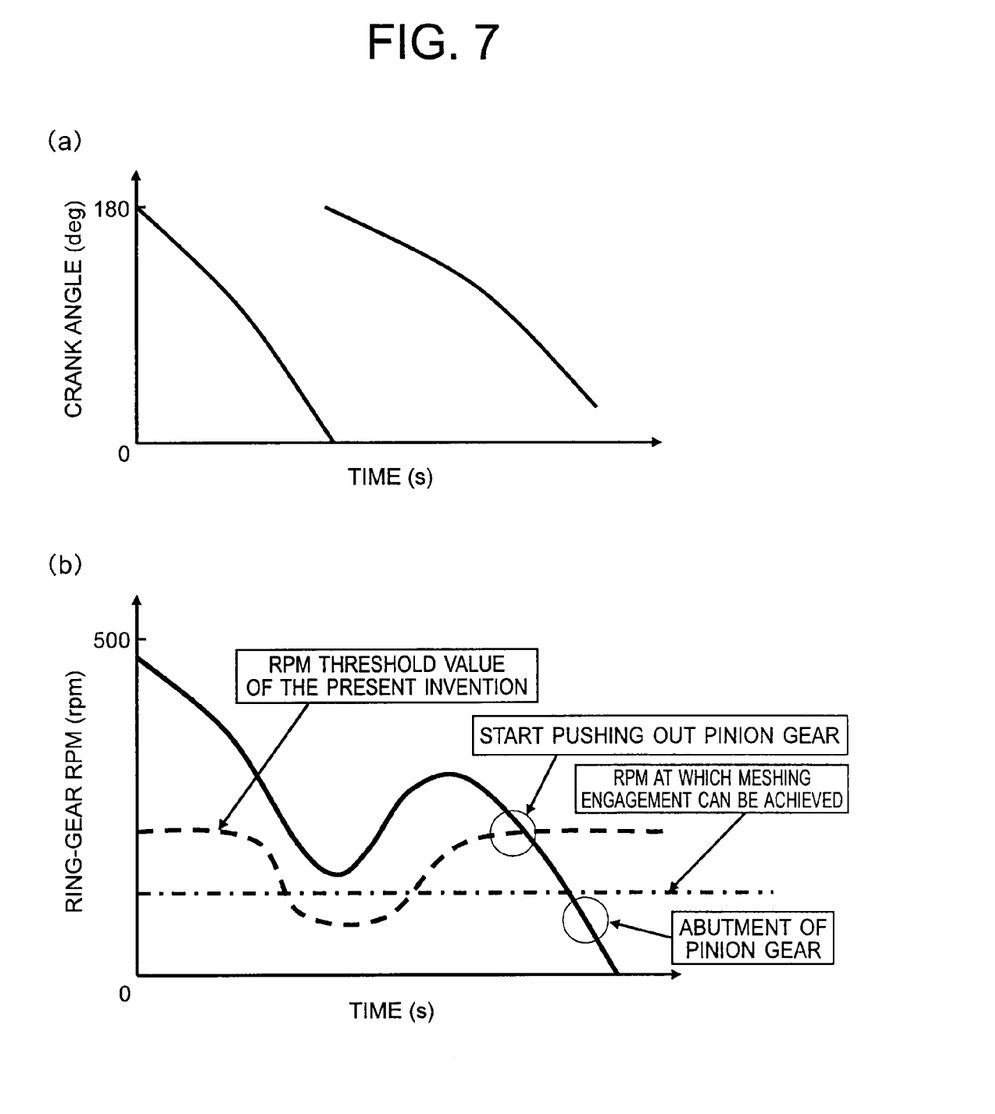
FIG. 7 Image diagrams illustrating temporal changes in the ring-gear rpm and the crank angle while the engine is rotating by inertia when the threshold value is set for each crank angle in the first embodiment of the present invention.

FIG. 7 are image diagrams illustrating temporal changes in the ring-gear rpm and the crank angle while the engine is rotating by inertia when the threshold value is set for each crank angle according to the first embodiment of the present invention. FIG. 7(a) shows the crank angle, and FIG. 7(b) shows the ring-gear rpm and a variable threshold value (see "rpm threshold value of the present invention" and "rpm at which meshing engagement can be achieved"). As shown in FIG. 7, the rpm threshold value is changed for each crank angle $C_{ang}$. As a result, when the pinion gear 14 and the ring gear 11 actually come into abutment against each other after the pinion gear 14 is pushed out and the rpm is then increased, the rpm can be prevented from being out of the range in which the meshing engagement can be achieved.

Moreover, by setting the threshold value $Tr_2$ to an rpm higher than $Tr_1$, the pinion gear 14 and the ring gear 11 can be brought into meshing engagement with each other more quickly when the restart request is made. When the restart request is not made, the meshing engagement is achieved at a smaller rpm, so that the meshing engagement can be achieved quietly.

As described above, the threshold value Tr is set for each crank angle $C_{ang}$. The threshold value Tr is set lower at the crank angle in the vicinity of TDC. As a result, when the pinion gear 14 and the ring gear 11 actually come into abutment against each other after the push-out of the pinion gear is started and the ring-gear rpm Nr then starts increasing, the ring-gear rpm Nr is prevented from being out of the range in which the meshing engagement can be achieved.

As described above, the engine starting device 19 according to the first embodiment of the present invention includes the ring gear 11 for transmitting the rotation of the engine, the crank-angle sensor 12 for detecting the crank angle of the engine, the starter 18, and the controller 13 for controlling the energizaiton of the starter 18 and the solenoid 16. The starter 18 includes the pinion gear 14 for transmitting the rotation of the starter motor 17, the plunger 15 for pushing out and bringing the pinion gear 14 into meshing engagement with the ring gear 11, and the solenoid 16 capable of moving the plunger 15 by being energized. The controller 13 can control the energization of the starter motor 17 and the energization of the solenoid 16.

The controller 13 and the engine ECU 10 have the threshold value for each crank angle detected by the crank-angle sensor 12 according to the flowcharts of FIGS. 2 and 3. When the ring-gear rotation speed obtained by the above-mentioned crank angle becomes smaller than the above-mentioned threshold value, the solenoid 16 is energized to start pushing out the pinion gear.

As described above, according to this embodiment, the satisfaction of the idle-stop conditions is input to the controller 13 by the engine ECU 10. While the engine rpm is reduced by the rotation by inertia, the threshold value is set for each crank angle. For the crank angle in the vicinity of TDC, the threshold value is set low. As a result, when the pinion-gear 14 and the ring gear 11 actually come into abutment against each other after the start of push-out of the pinion gear and the ring-gear rpm then starts increasing, the ring-gear rpm is prevented from being out of the range in which the meshing engagement can be achieved. As a result, noise generated by meshing between the ring gear 11 and the pinion gear 14 can be reduced. Further, by reducing a shock, the lifetime of the components can be prolonged.

In this embodiment, the threshold value Tr is set low at the crank angle $C_{ang}$ corresponding to the vicinity of TDC. Alternatively, the pinion gear can be inhibited from being pushed out. In FIG. 1, the controller 13 and the engine ECU 10 are provided as being independent of each other. However, the engine ECU 10 may perform the processing instead of providing the controller 13. Moreover, the angle in the vicinity of TDC in this embodiment may be a crank angle at which the number of cylinders for which the intake valve and the exhaust valve of the piston are both closed is only one.

Second Embodiment

Figure 8:
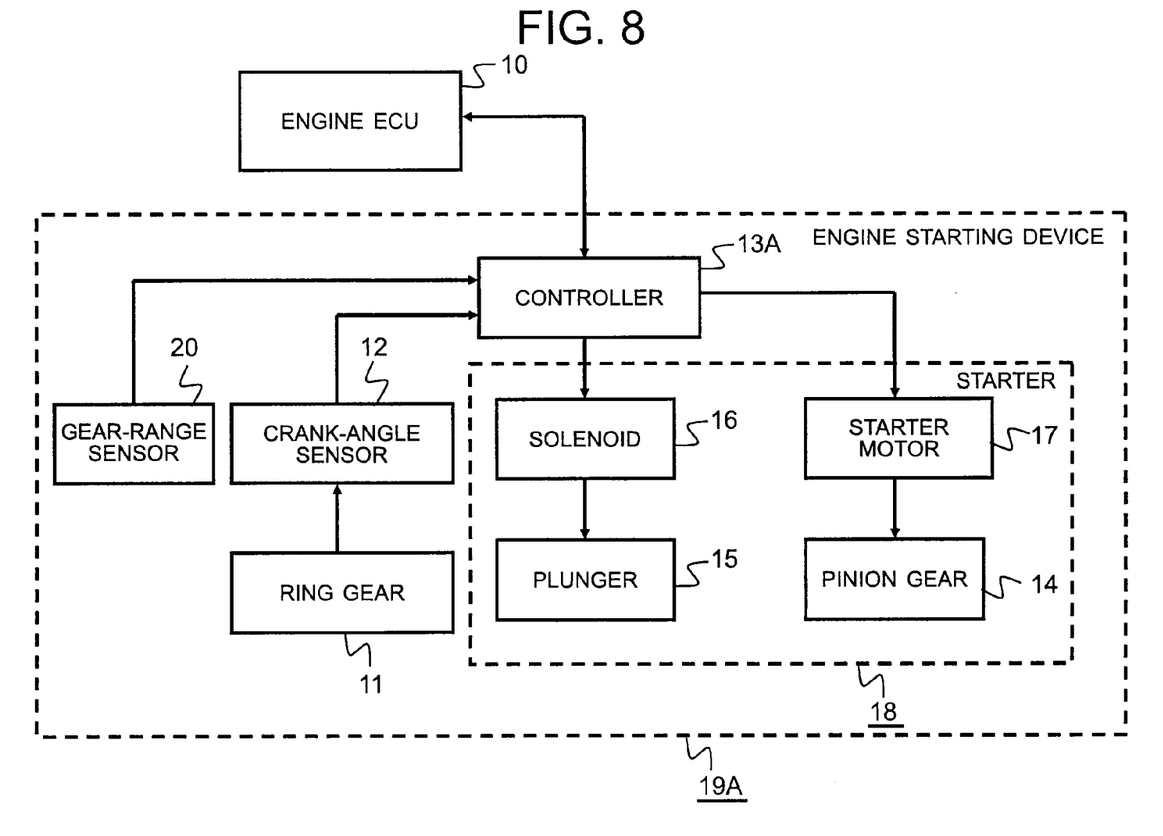
FIG. 8 A block diagram illustrating a schematic configuration of an engine starting device according to a second embodiment of the present invention.

FIG. 8 is a block diagram illustrating a schematic configuration of an engine starting device according to a second embodiment of the present invention. The engine starting device illustrated in FIG. 8 further includes a gear-range sensor 20 (constituting gear-range detecting section) for detecting a gear range of a transmission in which a gear position is set. For each gear range, each threshold value Tr (including $Tr_1$ and $Tr_2$; the same is applied to the following) may be set for each gear range. Accordingly, a controller 13A is provided as the controller.

Figure 9:
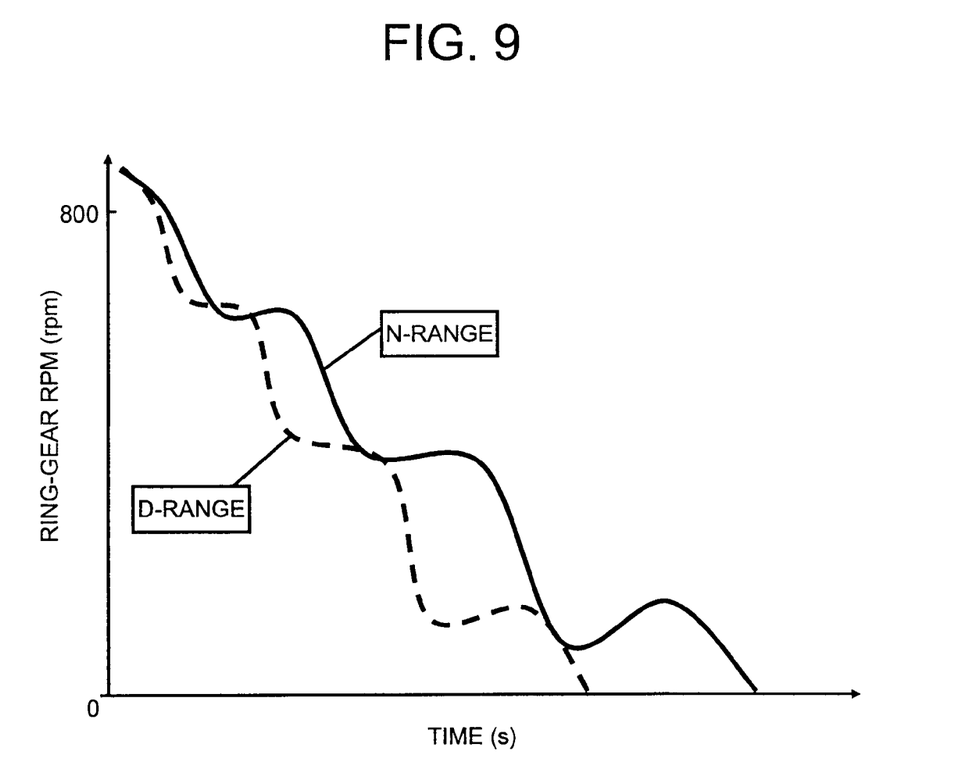
FIG. 9 A graph showing a difference in a ring-gear rpm reduction characteristic between gear ranges while the engine is rotating by inertia due to idle stop.

FIG. 9 shows a ring-gear rpm reduction characteristic for each gear range while the engine is rotating by inertia due to the idle-stop. As shown in FIG. 9, when the gear position is in a drive (D) gear range, the engine and a drive system are connected by the selection of D range as compared with the case where the gear position is in a neutral (N) gear range. Therefore, a friction torque and a viscous torque are transmitted from a tire or the transmission. Therefore, the engine rpm during the rotation by inertia reduces more rapidly in some cases. Therefore, when the gear position in the D range is detected by the gear-range sensor 20, the threshold value Tr is set high as compared with the case where the gear position is in the N range.

As a result, even when the idle stop is performed while the gear position is in the D range, the meshing engagement can be achieved within a target range of the ring-gear rpm. As a result, the pinion gear 14 and the ring gear 11 can be brought into meshing engagement more smoothly.

Third Embodiment

Figure 10:
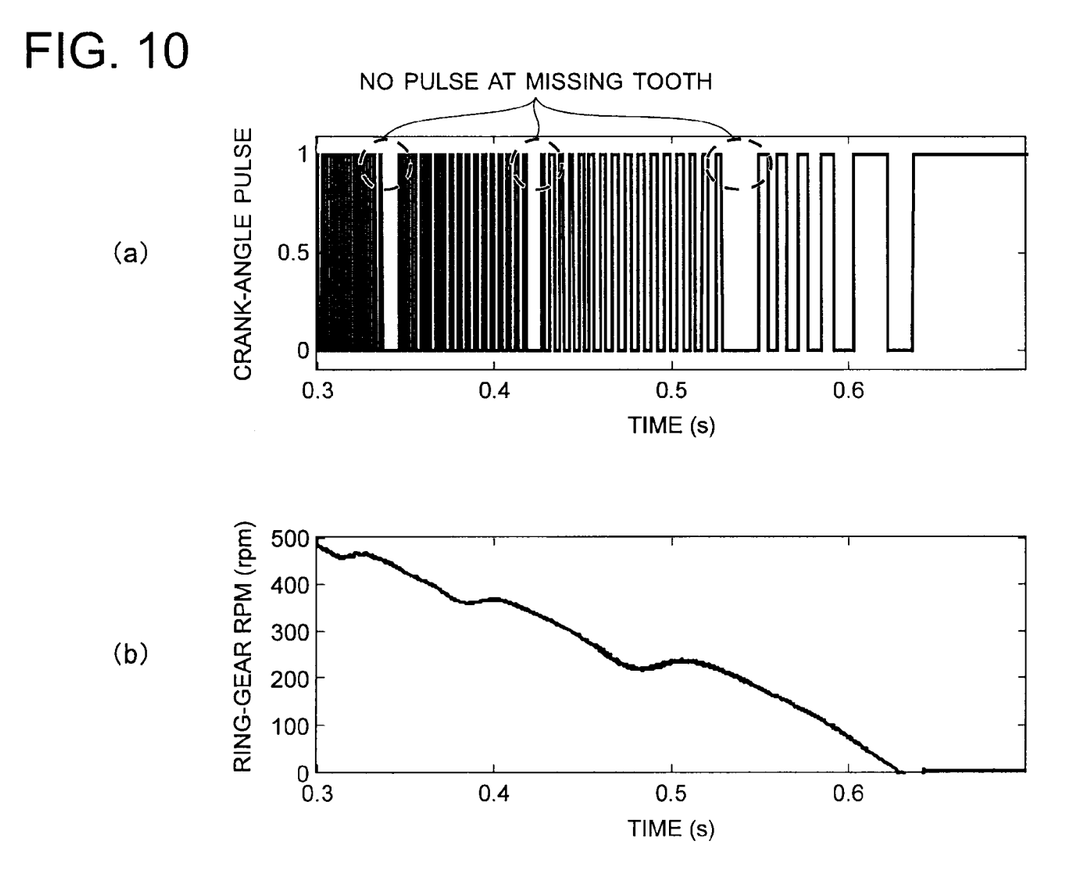
FIG. 10 Diagrams respectively illustrating a temporal change in a crank-angle pulse and the ring-gear rpm.

For the pulse detected by the above-mentioned crank-angle sensor 12, there is an angle range in which the pulse is not output so as to find a reference position of the crank angle or a cam angle, so-called a missing-tooth angle. FIG. 10(*a*) shows a temporal change in the crank-angle pulse including the missing-tooth angle range, and FIG. 10(*b*) shows a temporal change in the ring-gear rpm in the same time. As shown in FIG. 10, the pulse generated by the crank angle is not detected over time of a double or triple of a normal angle. Meanwhile, the ring-gear rpm Nr disadvantageously changes. In some cases, the pulse is not input until the engine is fully stopped. Therefore, it may happen that the ring-gear rpm is not updated.

Therefore, the threshold value Tr (including $Tr_1$ and $Tr_2$; the same is applied to the following) within an angle range immediately before the angle range in which the missing tooth is present may be set high so that the pinion gear is pushed out at earlier timing. As a result, in a waiting state in which the pulse signal from the crank angle is not input within the angle range where the missing tooth is present, the actual ring-gear rpm Nr can be prevented from being greatly changed or the rotation of the ring gear can be prevented from being completely stopped.

Each of the aforementioned threshold values may be changed according to a battery voltage or a vehicle speed. For example, when the battery voltage is low, a current flowing through the solenoid 16 becomes smaller. Therefore, a force for moving the pinion gear 14 becomes weak. As a result, time from the start of energization of the solenoid 16 to the achievement of abutment of the ring gear and the pinion gear becomes long. Therefore, by setting the threshold values larger when the battery voltage is low, the ring-gear rpm at the time of abutment of the gears can be reduced.

For example, the controller 13 and the engine ECU 10, which constitute the pinion-gear push-out control section, also constitute power-supply voltage detecting section. The battery voltage is obtained from a power-supply voltage signal input from an external battery voltage sensor (not shown) or the like to the engine ECU 10 for normal engine control. Based on the battery voltage, each of the threshold values is set as described above.

On the other hand, when the vehicle speed is high, a forward torque is sometimes transmitted from the rotation of the tire or the like to the engine to reduce the change amount in the ring-gear rpm in the case where, for example, the gear position is set in the D range. Therefore, by setting each of the threshold values described above smaller when the vehicle speed is high, the ring-gear rpm at the time of abutment of the gears can be reduced.

For example, the controller 13 and the engine ECU 10, which constitute the pinion-gear push-out control section, also constitute vehicle-speed detecting section. The vehicle speed is obtained from a vehicle-speed signal input from an external vehicle-speed sensor (not shown) or the like to the engine ECU 20 for normal engine control or/and a gear-range signal is obtained from the gear-range sensor 20. Each of the threshold values is set as described above according to the vehicle speed or/and the gear range.

It is apparent that the present invention is not limited to each of the embodiments described above and therefore encompasses all the possible combinations thereof. Therefore, the threshold value for determining the timing at which the ring gear and the ring gear are brought into meshing engagement is set in consideration of a plurality of desired ones of setting for each crank angle, the gear range of the transmission, whether or not the restart condition is satisfied, the missing-tooth angle range of the crank-angle sensor. When all the conditions are taken into consideration, the threshold value is set for each crank angle and each gear range of the transmission, in consideration of whether or not the restart condition is satisfied, and in consideration of the missing-tooth angle range of the crank-angle sensor.

REFERENCE SIGNS LIST

10 engine ECU, 11 ring gear, 12 crank angle sensor, 13, 13A controller, 14 pinion gear, 15 plunger, 16 solenoid, 17 starter motor, starter, 19 engine starting device, 20 gear-range sensor.

The invention claimed is:

1. An engine starting device for an automatic idle-stop system for performing idle-stop when a predetermined idle-stop condition is satisfied and for restarting an engine when a restart condition is satisfied, comprising:
    a crank-angle sensor for detecting a crank angle of the engine;
    a ring gear connected to a crankshaft of the engine;
    a ring-gear rpm detecting section for detecting an rpm of the ring gear;
    a starter motor for starting the engine;
    a pinion gear for transmitting rotation of the starter motor to the ring gear;
    a pinion-gear push-out section for pushing out the pinion gear to bring the pinion gear into meshing engagement with the ring gear; and
    a pinion-gear push-out control section for driving the pinion-gear push-out section to bring the pinion gear and the ring gear into meshing engagement when the ring-gear rpm detected by the ring-gear rpm detecting section becomes smaller than a predetermined threshold value,
    wherein the predetermined threshold value is determined by at least one of the crank angle, a gear range, and the restart condition.

2. The engine starting device according to claim 1, wherein the pinion-gear push-out control section drives the pinion-gear push-out section to bring the pinion gear and the ring gear into meshing engagement when the ring-gear rpm becomes smaller than a first threshold value after rotation of the engine is reduced by the idle stop as a result of satisfaction of the idle-stop condition and drives the pinion-gear push-out section to bring the pinion gear and the ring gear into meshing engagement for restart in a case where the ring-gear rpm is smaller than a second threshold value higher than the first threshold value when the restart condition is satisfied before the ring gear rpm becomes smaller than the first threshold value.

3. The engine starting device according to claim 2, further comprising a gear-range detecting section for detecting a current set position of a gear range of a transmission of the engine, wherein the first threshold value and the second threshold value of the pinion-gear push-out control section are set for each gear range detected by the gear-range detecting section.

4. The engine starting device according to claim 2, wherein the first threshold value and the second threshold value of the pinion-gear push-out control section are set lower in a predetermined crank-angle range in a vicinity of TDC of each cylinder of the engine.

5. The engine starting device according to claim 4, wherein the predetermined crank-angle range in the vicinity of TDC is a crank-angle range in which an angular acceleration of rotation of the engine tends to increase.

6. The engine starting device according to claim 4, wherein the predetermined crank-angle range in the vicinity of TDC is a crank-angle range corresponding to a cylinder for which an intake valve and an exhaust valve of a piston of the engine are both closed.

7. The engine starting device according to claim 2, wherein the pinion-gear push-out control section does not drive the pinion-gear push-out section in a predetermined crank-angle range in a vicinity of TDC of each cylinder of the engine.

8. The engine starting device according to claim 7, wherein the predetermined crank-angle range in the vicinity of TDC is a crank-angle range in which an angular acceleration of rotation of the engine tends to increase.

9. The engine starting device according to claim 7, wherein the predetermined crank-angle range in the vicinity of TDC is a crank-angle range corresponding to a cylinder for which an intake valve and an exhaust valve of a piston of the engine are both closed.

10. The engine starting device according to claim 2, wherein, when there is an angle range in which a pulse of the crank-angle sensor is not detected so as to obtain a reference of the crank angle, the first threshold value and the second threshold value in an angle range immediately before the angle range in which the pulse is not detected are set higher.

11. The engine starting device according to claim 2, further comprising a power-supply voltage detecting section for detecting a power-supply voltage, wherein the pinion-gear push-out control section sets the first threshold value and the second threshold value higher when the power-supply voltage detected by the power-supply voltage detecting section is lower than a predetermined voltage.

12. The engine starting device according to claim 2, further comprising a vehicle-speed detecting section for detecting a vehicle speed, wherein the pinion-gear push-out control section changes the first threshold value and the second threshold value according to the vehicle speed detected by the vehicle-speed detecting section.

13. The engine starting device according to claim 1, further comprising a gear-range detecting section for detecting a current set position of a gear range of a transmission of the engine, wherein the predetermined threshold value of the pinion-gear push-out control section is set for each gear range detected by the gear-range detecting section.

14. The engine starting device according to claim 1, wherein the predetermined threshold value of the pinion-gear push-out control section is set lower in a predetermined crank-angle range in a vicinity of TDC of each cylinder of the engine.

15. The engine starting device according to claim 14, wherein the predetermined crank-angle range in the vicinity of TDC is a crank-angle range in which an angular acceleration of rotation of the engine tends to increase.

16. The engine starting device according to claim 14, wherein the predetermined crank-angle range in the vicinity of TDC is a crank-angle range corresponding to a cylinder for which an intake valve and an exhaust valve of a piston of the engine are both closed.

17. The engine starting device according to claim 1, wherein the pinion-gear push-out control section does not drive the pinion-gear push-out section in a predetermined crank-angle range in a vicinity of TDC of each cylinder of the engine.

18. The engine starting device according to claim 17, wherein the predetermined crank-angle range in the vicinity of TDC is a crank-angle range in which an angular acceleration of rotation of the engine tends to increase.

19. The engine starting device according to claim 17, wherein the predetermined crank-angle range in the vicinity of TDC is a crank-angle range corresponding to a cylinder for which an intake valve and an exhaust valve of a piston of the engine are both closed.

20. The engine starting device according to claim 1, wherein, when there is an angle range in which a pulse of the crank-angle sensor is not detected so as to obtain a reference of the crank angle, the predetermined threshold value in an angle range immediately before the angle range in which the pulse is not detected is set higher.

21. The engine starting device according to claim 1, further comprising a power-supply voltage detecting section for detecting a power-supply voltage, wherein the pinion-gear push-out control section sets the predetermined threshold value higher when the power-supply voltage detected by the power-supply voltage detecting section is lower than a predetermined voltage.

22. The engine starting device according to claim 1, further comprising a vehicle-speed detecting section for detecting a vehicle speed, wherein the pinion-gear push-out control section changes the predetermined threshold value according to the vehicle speed detected by the vehicle-speed detecting section.

* * * * *